(12) United States Patent
Miyamoto

(10) Patent No.: US 11,808,345 B2
(45) Date of Patent: Nov. 7, 2023

(54) COMPUTING DEVICE

(71) Applicant: Hitachi Astemo, Ltd., Hitachinaka (JP)

(72) Inventor: Shogo Miyamoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 29 days.

(21) Appl. No.: 17/417,868

(22) PCT Filed: Dec. 12, 2019

(86) PCT No.: PCT/JP2019/048610
§ 371 (c)(1),
(2) Date: Jun. 24, 2021

(87) PCT Pub. No.: WO2020/137565
PCT Pub. Date: Jul. 2, 2020

(65) Prior Publication Data
US 2022/0074488 A1 Mar. 10, 2022

(30) Foreign Application Priority Data
Dec. 28, 2018 (JP) .................................. 2018-247774

(51) Int. Cl.
*F16H 57/04* (2010.01)
*H02K 9/19* (2006.01)

(52) U.S. Cl.
CPC ..... *F16H 57/0475* (2013.01); *F16H 57/0445* (2013.01); *F16H 57/0476* (2013.01); *H02K 9/19* (2013.01)

(58) Field of Classification Search
CPC ............. F16H 57/0475; F16H 57/0445; F16H 57/0476; F16H 57/0413; F16H 57/0435; B60K 11/04; H02K 9/19; H02P 29/00
(Continued)

(56) References Cited

U.S. PATENT DOCUMENTS

2004/0163409 A1* 8/2004 Nakajima ............... B60L 3/003
  62/505
2014/0311704 A1 10/2014 Yokoyama et al.
(Continued)

FOREIGN PATENT DOCUMENTS

JP 2004-248402 A 9/2004
JP 2004-260898 A 9/2004
(Continued)

OTHER PUBLICATIONS

International Search Report (PCT/ISA/210) issued in PCT Application No. PCT/JP2019/048610 dated Feb. 25, 2020 with English translation (four (4) pages).
(Continued)

*Primary Examiner* — Yi-Kai Wang
(74) *Attorney, Agent, or Firm* — Crowell & Moring LLP

(57) ABSTRACT

An object of the present invention is to appropriately control cooling water and oil according to situations. A computing device controls a flow rate of cooling water supplied to a motor and an oil pump that supplies oil from a gear box attached to the motor to a coil of the motor. The computing device suppresses the flow rate of the cooling water supplied to the motor when a temperature of oil in the gear box is less than a first threshold, and a temperature of the coil is less than a second threshold, and operates the oil pump.

6 Claims, 6 Drawing Sheets

(58) Field of Classification Search
USPC .................................................. 123/41.31
See application file for complete search history.

(56) References Cited

U.S. PATENT DOCUMENTS

2018/0128155 A1* 5/2018 Yoshida ................. F01P 7/14
2019/0293533 A1* 9/2019 Warmuth ................ G01N 3/32
2020/0398639 A1* 12/2020 Maeda ............... B60H 1/00485

FOREIGN PATENT DOCUMENTS

| JP | 2004248402 A | * | 9/2004 | ......... F16H 57/0415 |
|----|--------------|---|--------|------------------------|
| JP | 2006-174562 A | | 6/2006 | |
| JP | 2013-110851 A | | 6/2013 | |
| JP | 2015-112943 A | | 6/2015 | |
| JP | 2017-34818 A | | 2/2017 | |
| JP | 2017034818 A | * | 2/2017 | |

OTHER PUBLICATIONS

Japanese-language Written Opinion (PCT/ISA/237) issued in PCT Application No. PCT/JP2019/048610 dated Feb. 25, 2020 (four (4) pages).

* cited by examiner

US 11,808,345 B2

COMPUTING DEVICE

TECHNICAL FIELD

The present invention relates to a computing device.

BACKGROUND ART

The use of motors as a drive source for vehicles is widespread. Cooling is indispensable because the motor generates heat when used. It is known that not only water but also oil is used for cooling the motor. PTL 1 describes a vehicle drive device that includes an electric motor, a lubricating oil cooling means that is installed outside the electric motor and cools the lubricating oil of the electric motor with cooling water, a cooling water circulating means that circulates the cooling water via a cooling water pipe between a cooling water cooling means for cooling the cooling water, the electric motor, and the lubricating oil means, and a lubricating oil circulating means that circulates the lubricating oil via a lubricating oil pipe between the lubricating oil cooling means and the electric motor.

CITATION LIST

Patent Literature

PTL 1: JP 2006-174562 A

SUMMARY OF INVENTION

Technical Problem

In the invention described in PTL 1, there is room for improvement in the control of cooling water and oil.

Solution to Problem

A computing device according to a first aspect of the present invention controls a flow rate of cooling water supplied to a motor and an oil pump that supplies oil from a gear box attached to the motor to a coil of the motor. The computing device suppresses the flow rate of the cooling water supplied to the motor when a temperature of oil in the gear box is less than a first threshold, and a temperature of the coil is less than a second threshold, and operates the oil pump.

Advantageous Effects of Invention

According to the present invention, it is possible to appropriately control cooling water and oil according to situations.

DESCRIPTION OF EMBODIMENTS

First Embodiment

Figure 1:
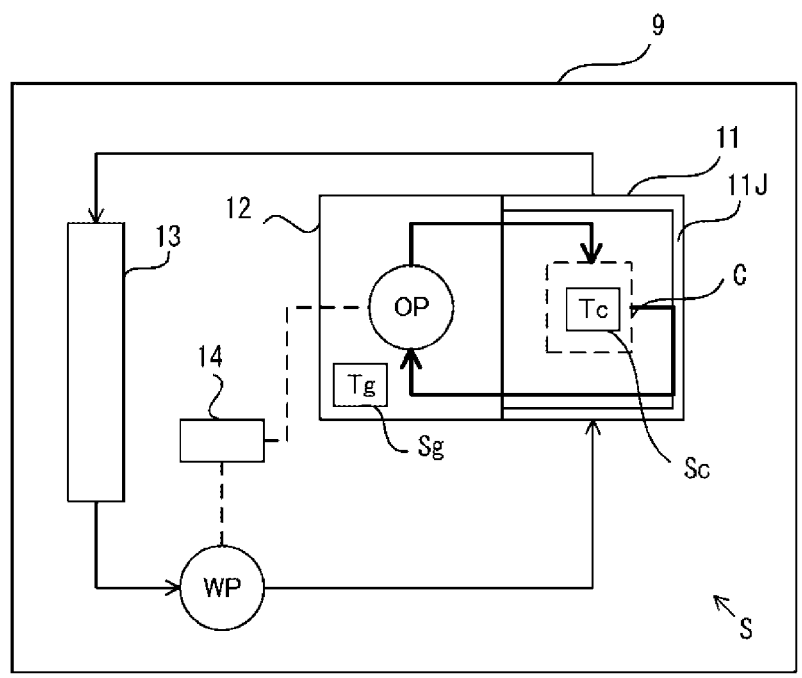
FIG. 1 is an overall configuration diagram of a cooling system S according to a first embodiment.

Hereinafter, a first embodiment of a cooling system S will be described below with reference to FIGS. 1 to 3.
(Overall Configuration)
FIG. 1 is an overall configuration diagram of the cooling system S. The cooling system S is mounted on a vehicle 9. The cooling system S includes a motor 11 with a built-in coil C, a gear box 12, a radiator 13, a computing device 14, an electric water pump WP, and an electric oil pump OP. The motor 11 includes a water jacket 11J having a cooling water passage. In FIG. 1, a thin solid line represents the movement of water, a thick solid line represents the movement of oil, and a broken line represents a signal line. In the following, "oil" and "oil" are used interchangeably, and "water" and "cooling water" are used interchangeably. Further, in FIG. 1, the inverter that shares the electric power with the motor 11 is not shown.

The water pumped by the water pump WP absorbs heat from the motor 11 in the water jacket 11J of the motor 11 and releases heat in the radiator 13. That is, in this embodiment, the water pumped by the water pump WP has a role as cooling water. The oil pump OP is built in the gear box 12 and supplies the oil used for lubricating and cooling the transmission to the coil C of the motor 11. The oil supplied to the coil C returns to the gear box 12 after the temperature with the coil C is homogenized.

The motor 11 includes a temperature sensor Sc that measures the temperature Tc of the coil C. The motor 11 operates with the electric power supplied from an inverter (not shown) based on an operation command of a motor control device (not shown). In this embodiment, the control method and operation of the motor 11 itself are not particularly limited. The temperature sensor Sc outputs information on the coil temperature Tc to the computing device 14. The gear box 12 includes a temperature sensor Sg that measures the oil temperature Tg in the gear box 12. The temperature sensor Sg outputs information on the oil temperature Tg to the computing device 14.

The computing device 14 is a device for performing computation, built into the vehicle 9, for example, an ECU (Electronic Control Unit). The computing device 14 outputs an operation command to the oil pump OP and the water pump WP based on the coil temperature Tc and the oil temperature Tg. The configuration of the computing device 14 will be described in detail with reference to FIG. 2 below. The rotation speeds of the water pump WP and the oil pump OP are controlled so that the flow rate can be adjusted.

Figure 2:
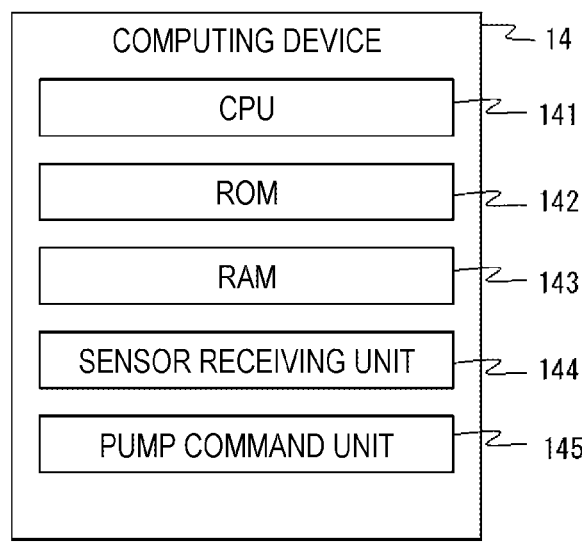
FIG. 2 is a configuration diagram of a computing device 14.

(Configuration of Computing Device 14)
FIG. 2 is a configuration diagram of the computing device 14. The computing device 14 includes a CPU 141 which is a central computing device, a ROM 142 which is a read-only storage device, and a RAM 143 which is a read/write storage device. The computing device 14 realizes the functions described later by the CPU 141 expanding the program stored in the ROM 142 to the RAM 143. The computing device 14 further includes a sensor receiving unit 144 that receives temperature information from the temperature sensor Sg and the temperature sensor Sc, and a pump command unit 145 that outputs an operation command to the oil pump OP and the water pump WP.

The sensor receiving unit 144 has a hardware configuration corresponding to the communication specifications of the temperature sensor Sg and the temperature sensor Sc. For example, if the temperature sensor Sg and the temperature sensor Sc are resistance temperature detectors, the sensor receiving unit 144 has hardware for measuring electrical resistance. Further, if the temperature sensor Sg and the temperature sensor Sc transmit the measured value as a digital signal, the sensor receiving unit 144 includes a digital signal processing circuit. The pump command unit 145 has a hardware configuration corresponding to the communication specifications of the oil pump OP and the water pump WP. For example, when the oil pump OP and the water pump WP can set the target rotation speed by analog signals of current and voltage, the pump command unit 145 includes a current generator and a voltage generator.

(Flowchart)

Figure 3:
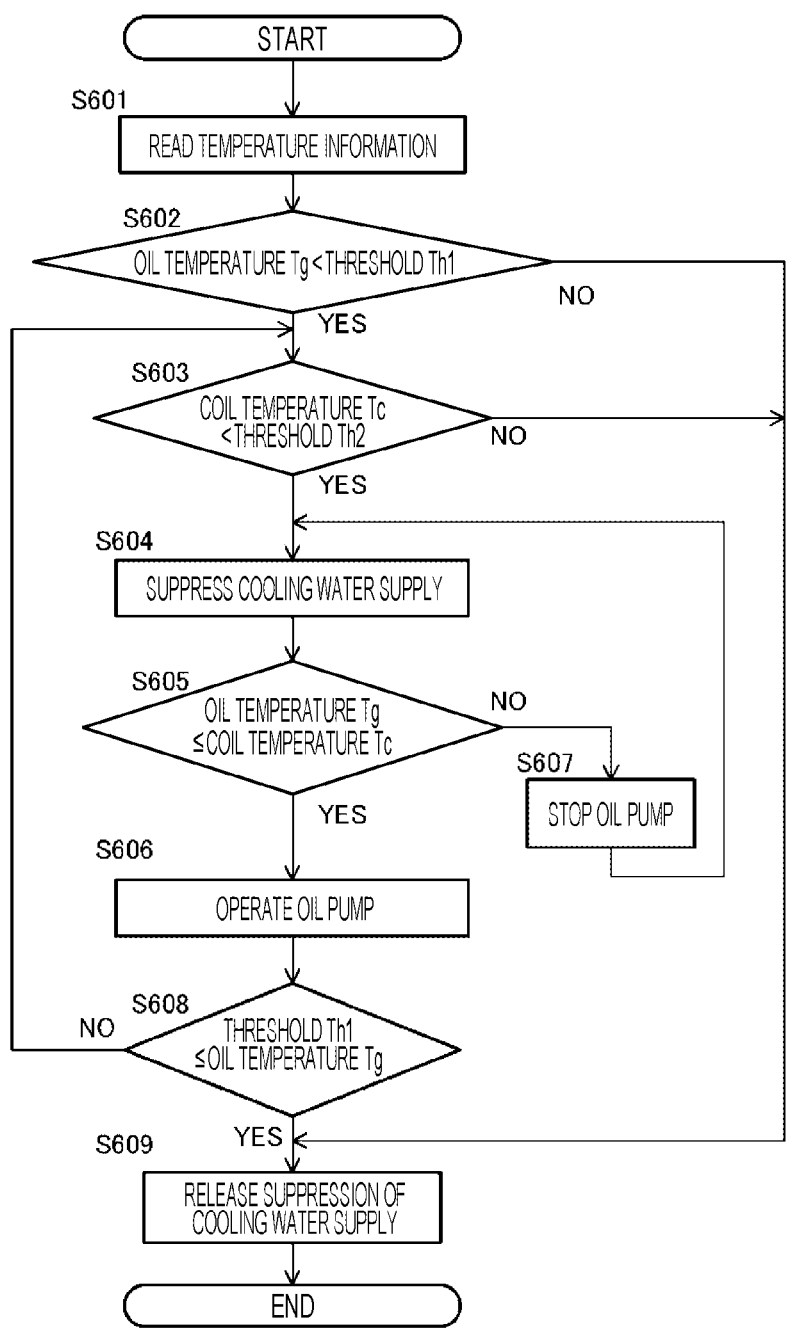
FIG. 3 is a flowchart showing the operation of the computing device 14.

FIG. 3 is a flowchart showing the operation of the computing device 14. The execution subject of each step described below is the CPU 141. When the ignition key switch of the vehicle 9 is turned on, the computing device 14 performs the following operations. That is, the operation described below is executed when the vehicle 9 is started.

The computing device 14 first reads the temperature information from the temperature sensor Sg and the temperature sensor Sc (S601). Although the temperature information is continuously read after this, the description is omitted in the flowchart. Next, the computing device 14 determines whether the read oil temperature Tg is less than a first threshold Th1 stored in the ROM 142. In S602, the computing device 14 determines whether the oil temperature Tg is at a low temperature at which the viscosity of the oil increases and friction, that is, the problem of friction can occur. The computing device 14 proceeds to S603 when it determines that the oil temperature Tg is less than the first threshold Th1, and proceeds to S609 when it determines that the oil temperature Tg is equal to or more than the first threshold Th1.

In S603, the computing device 14 determines whether the read coil temperature Tc is less than a second threshold Th2 stored in the ROM 142. In this S603, the computing device 14 determines whether the coil temperature Tc is in a high temperature range where the coil C may be damaged. The computing device 14 proceeds to S604 when it determines that the coil temperature Tc is less than the second threshold Th2, and proceeds to S609 when it determines that the coil temperature Tc is equal to or more than the second threshold Th2.

In S604, the computing device 14 suppresses the cooling water supplied to the motor 11. Specifically, the computing device 14 sets the output of the water pump WP to the minimum, for example, a minimum rotation speed that can be set. When the output of the water pump WP has already been set to the minimum in S604, the output is maintained to the minimum without any special change. In the following S605, the computing device 14 determines whether the oil temperature Tg is equal to or lower than the coil temperature Tc. The intention of establishing this S605 is as follows. That is, if the oil temperature Tg is higher than the coil temperature Tc, the oil temperature drops when the oil is supplied to the coil C, which is the intention to prevent this. The computing device 14 proceeds to S606 when it determines that the oil temperature Tg is equal to or lower than the coil temperature Tc, and proceeds to S607 when it determines that the oil temperature Tg is higher than the coil temperature Tc.

In S606, the computing device 14 operates the oil pump OP at a predetermined rotation speed and proceeds to S608. In S607, the computing device 14 stops the operation of the oil pump OP, that is, sets the rotation speed of the oil pump OP to zero and returns to S604. If the output of the oil pump OP has already stopped in S607, the oil pump OP will be maintained in the stopped state without making any special changes. In S608, the computing device 14 determines whether the oil temperature Tg has risen to the first threshold Th1 or higher, proceeds to S609 when it is determined as affirmative, and returns to S603 when it is determined as negative. In S609, the computing device 14 releases the suppression of the cooling water supplied to the motor 11. Specifically, the computing device 14 sets the output of the water pump WP to a normal level, for example, a predetermined rotation speed, and ends the process shown in FIG. 3.

According to the first embodiment, the following operational effects are obtained.

(1) The computing device 14 controls the flow rate of the cooling water supplied to the motor 11 and the oil pump OP that supplies oil from the gear box 12 attached to the motor 11 to the coil C of the motor 11. When the temperature of the oil in the gearbox 12 is less than the first threshold Th1 and the temperature of the coil C is less than the second threshold Th2 (S602: YES and S603: YES in FIG. 3), the computing device 14 suppresses the flow rate of the cooling water supplied to the motor 11 (S604), and operates the oil pump OP (S606). Therefore, when the friction of the gear box 12 is large because the oil temperature Tg is low and the viscosity is high, the oil temperature Tg can be increased to lower the friction of the gear box 12. Further, when the coil temperature is equal to or higher than the second threshold Th2, the supply of cooling water is not suppressed, so that there is no risk of damaging the motor 11, and the computing device 14 can appropriately control the cooling water and oil according to the situation.

(2) The computing device 14 controls the oil pump OP that supplies cooling water to the motor 11. Suppressing the flow rate of the cooling water supplied to the motor 11 means setting the rotation speed of the water pump WP to the minimum rotation speed that can be set. Therefore, the computing device 14 can realize appropriate control of the cooling water according to the situation by controlling the water pump WP.

(3) When the temperature of the oil in the gear box 12 is less than the first threshold Th1 (S602: YES), and the temperature of the coil C is less than the second threshold Th2 (S603: YES), the computing device 14 operates the oil pump OP if the temperature of the oil in the gearbox 12 is equal to or less than the temperature of the coil C (S605: YES, S606), and stops the oil pump OP if the temperature of the oil in the gear box 12 is higher than the temperature of the coil C (S605: NO, S607). Therefore, when the temperature Tc of the coil C is lower than the oil temperature Tg, it is possible to prevent the oil temperature from dropping by supplying oil to the coil C.

(First Modification)

Even if the computing device 14 may be realized by FPGA (Field Programmable Gate Array), which is a rewritable logic circuit instead of the combination of the CPU 141, the ROM 142, and the RAM 143, or ASIC (Application Specific Integrated Circuit) which is an integrated circuit for specific applications. Further, the computing device 14 may be realized by a combination of different configurations, for example, a combination of the CPU 141, the ROM 142, the RAM 143, and the FPGA, instead of the combination of the CPU 141, the ROM 142, and the RAM 143.

(Second Modification)

If the rotation of the water pump WP can be stopped, the computing device 14 may stop the rotation of the water pump WP in S604 of FIG. 3.

(Third Modification)

The shape and dimensions of the flow path of the cooling water in the water jacket 11J are well known. Therefore, the Reynolds number can be calculated and a maximum flow rate of the cooling water (hereinafter, referred to as "limit flow rate") in which the flow of the cooling water becomes a laminar flow can be calculated in advance in the water jacket 11J. The computing device 14 may control the rotation speed of the water pump WP to the rotation speed of the limit flow rate or less in S604 of FIG. 3.

According to the third modification, the following effects can be obtained.

(4) The water pump WP includes the water jacket 11J through which the cooling water passes. Suppressing the flow rate of the cooling water in the S604 means reducing the flow rate of the cooling water supplied to the motor 11 so that the flow of the cooling water in the water jacket 11J becomes a laminar flow. Therefore, the flow of the cooling water in the water jacket 11J becomes a laminar flow, so that the efficiency of heat exchange between the motor 11 and the cooling water is greatly reduced, and the temperature drop of the motor 11 is suppressed.

(Fourth Modification)

The cooling water pumped by the water pump WP may also be cooled by the inverter that supplies electric power to the motor 11.

Figure 4:
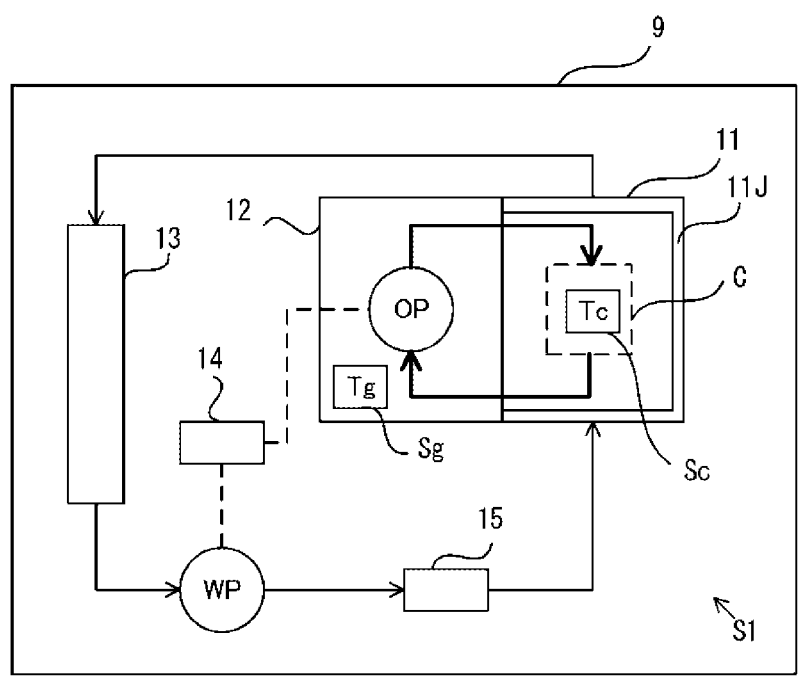
FIG. 4 is an overall configuration diagram of a cooling system S1 in a fourth modification.

FIG. 4 is an overall configuration diagram of the cooling system S1 in the fourth modification. The cooling system S1 further includes an inverter 15 in addition to the configuration of the cooling system S in the first embodiment. The inverter 15 supplies electric power to the motor 11 based on an operation command of a motor control device (not shown). However, in FIG. 4, the signal line between the inverter 15 and the motor control device (not shown) and the power supply line from the inverter 15 to the motor 11 are not shown. According to this modification, the inverter 15 can also be cooled by the cooling water.

(Fifth Modification)

At least one of the water pump WP and the oil pump OP may be rotated for a predetermined time before the motor 11 is energized. This is to discharge the air contained in the oil and the cooling water.

Second Embodiment

A second embodiment of the computing device will be described with reference to FIG. 5. In the following description, the same components as those in the first embodiment are denoted by the same reference numerals, and differences will be mainly described. The points that are not particularly described are the same as in the first embodiment. This embodiment differs from the first embodiment mainly in that the cooling system includes a control valve.

Figure 5:
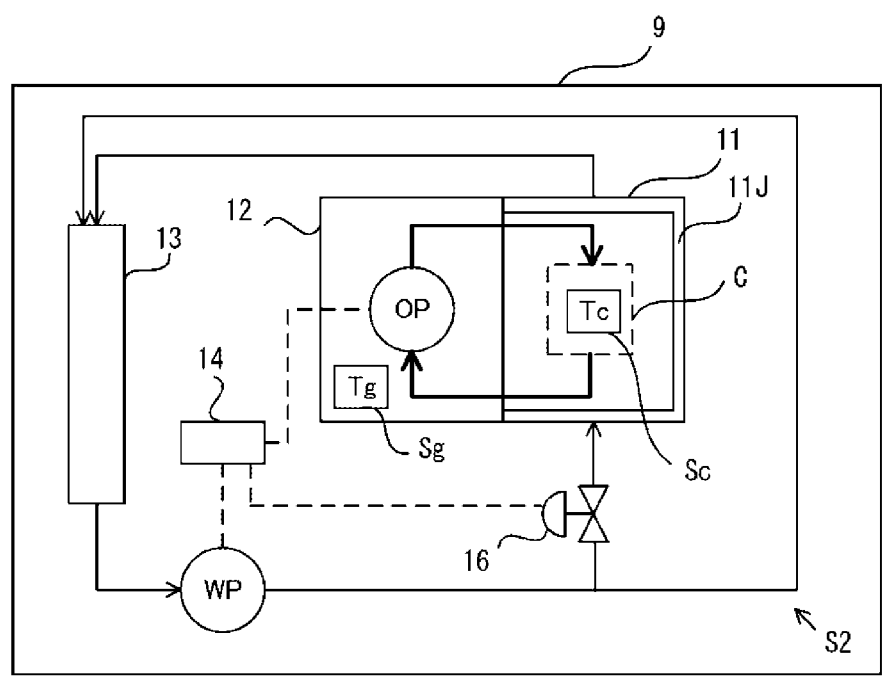
FIG. 5 is an overall configuration diagram of a cooling system S2 according to a second embodiment.

FIG. 5 is an overall configuration diagram of the cooling system S2 according to the second embodiment. The cooling system S2 further includes a control valve 16 in addition to the configuration of the cooling system S in the first embodiment. The control valve 16 operates according to an operation command of the computing device 14. The control valve 16 is provided on the motor 11 side after branching downstream of the water pump WP.

The control valve 16 is an adjustment valve that can be adjusted to an arbitrary valve opening degree of 0 to 100%. When the control valve 16 is fully closed, the total flow rate discharged by the water pump WP bypasses the motor 11 and flows to the radiator 13, and when the control valve 16 is not fully closed, the cooling water also flows to the motor 11. However, the control valve 16 does not have to be fully closed. In other words, the control valve 16 does not have to have a Cv value of zero when the valve opening degree is 0%.

In this embodiment, the computing device 14 suppresses the rotation speed of the water pump WP in S604 and sets the valve opening degree of the control valve 16 to a minimum valve opening degree that can be set. Further, the computing device 14 sets the rotation speed of the water pump WP to a normal level in S609, and sets the valve opening degree of the control valve 16 to a predetermined value larger than 0%.

According to the second embodiment, the following operational effects are obtained.

(5) The computing device 14 controls the control valve 16 that controls the flow rate of the cooling water supplied to the motor 11. Suppressing the flow rate of the cooling water supplied to the motor 11 means operating the valve opening degree of the control valve 16 so that the cooling water supplied to the motor 11 is reduced. Therefore, the computing device 14 can realize appropriate control of the cooling water according to the situation by operating the valve opening degree of the control valve 16.

(First Modification of Second Embodiment)

The control valve 16 may be an opening/closing valve that can take only two states, fully open or fully closed, a so-called on/off valve. In this case, the computing device 14 sets the control valve 16 to be fully closed in S604 and the control valve 16 to be fully open in S609.

(Second Modification of Second Embodiment)

The control valve 16 may be provided downstream of the water pump WP on the bypass side after branching, that is, on the side opposite to that in FIG. 5. In this case, the computing device 14 sets the valve opening degree of the control valve 16 to a predetermined value larger than 0% in S604, and sets the valve opening degree of the control valve 16 to 0% in S609.

(Third Modification of Second Embodiment)

The computing device 14 does not have to control the water pump WP. That is, the computing device 14 may realize the control of the cooling water substantially the same as that of the first embodiment by controlling the valve opening degree of the control valve 16. In this case, the water pump WP is always controlled to a constant rotation speed.

Third Embodiment

A third embodiment of the computing device will be described with reference to FIG. 6. In the following description, the same components as those in the second embodiment are denoted by the same reference numerals, and differences will be mainly described. The points that are not particularly described are the same as in the second embodiment. This embodiment differs from the second embodiment mainly in that the cooling system includes an inverter.

Figure 6:
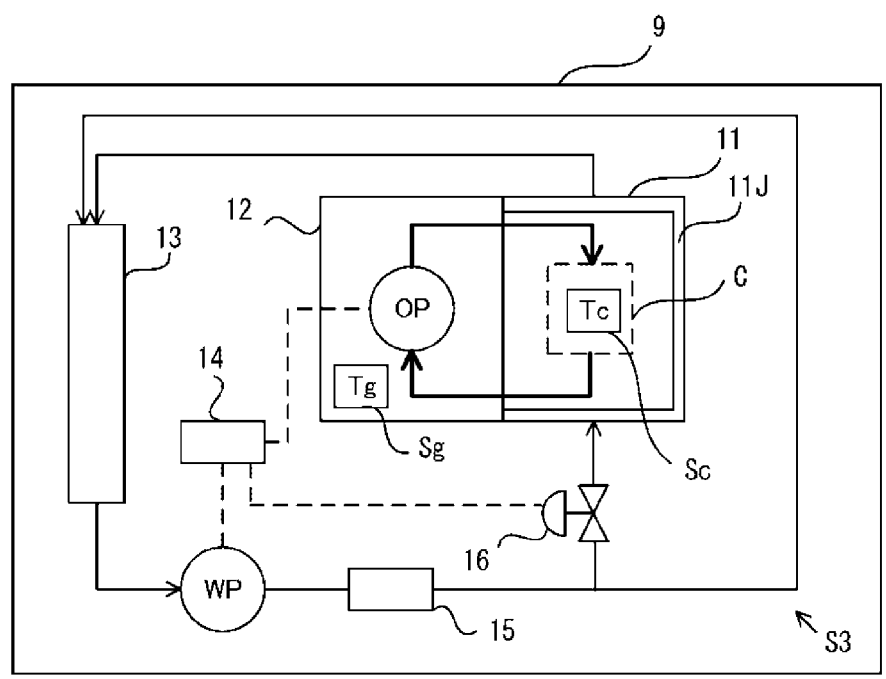
FIG. 6 is an overall configuration diagram of a cooling system S3 according to a third embodiment.

FIG. 6 is an overall configuration diagram of the cooling system S3 according to the third embodiment. The cooling system S3 further includes the inverter 15 and the control valve 16 in addition to the configuration of the cooling system. S in the first embodiment. The control valve 16 operates according to an operation command of the computing device 14. The control valve 16 is provided on the motor 11 side after branching downstream of the inverter 15. The operation of the computing device 14 is the same as that of the second embodiment.

According to the third embodiment, the following operational effects are obtained.

(6) The cooling water also cools the inverter 15 that supplies electric power to the motor 11. Suppressing the flow rate of the cooling water supplied to the motor 11 does not affect the flow rate of the cooling water supplied to the inverter 15. Therefore, the computing device 14 can appropriately control the cooling water and the oil according to the situation while also cooling the inverter 15.

(First Modification of Third Embodiment)

In the third embodiment described above, the inverter 15 is provided between the water pump WP and the branch. However, the inverter 15 may be provided immediately before the water pump WP, that is, at the position where the water pressure is the lowest. Further, the inverter 15 may be provided upstream of the radiator 13. In this case, it is desirable for the inverter 15 that both the cooling water that has passed through the motor 11 and the cooling water that has bypassed the motor 11 flow into the inverter 15 to cool the inverter 15.

(Second Modification of Third Embodiment)

The computing device 14 does not have to control the water pump WP. That is, the computing device 14 may realize the control of the cooling water substantially the same as that of the first embodiment by controlling the valve opening degree of the control valve 16. In this case, the water pump WP is always controlled to a constant rotation speed.

The above-described embodiments and modifications may be combined with each other. Various embodiments and modifications have been described, but the present invention is not limited to these contents. Other aspects which are conceivable within a scope of technical ideas of the present invention may be made within the scope of the present invention.

REFERENCE SIGNS LIST 9 vehicle
11 motor
11J water jacket
12 gear box
13 radiator
14 computing device
15 inverter
16 control valve

The invention claimed is:

1. A computing device that controls a flow rate of cooling water supplied to a water jacket of a motor, the water jacket discharging heat to the cooling water passing through the water jacket, and an oil pump that supplies oil from a gear box attached to the motor to a coil of the motor,
   wherein the computing device suppresses the flow rate of the cooling water supplied to the motor when a temperature of oil in the gear box is less than a first threshold and a temperature of the coil is less than a second threshold, such that a flow of the cooling water in the water jacket is a laminar flow, and the computing device operates the oil pump.

2. The computing device according to claim 1, wherein
   the computing device controls a water pump that supplies the cooling water to the motor, and
   wherein suppressing the flow rate of the cooling water supplied to the motor is setting a rotation speed of the water pump to a minimum rotation speed that can be set, or stopping an operation of the water pump.

3. The computing device according to claim 1, wherein
   the computing device controls a control valve that controls a flow rate of the cooling water supplied to the motor, and
   wherein suppressing the flow rate of the cooling water supplied to the motor is setting the control valve to a valve opening degree of a predetermined value or less.

4. The computing device according to claim 1, wherein the cooling water also cools an inverter that supplies electric power to the motor.

5. The computing device according to claim 1, wherein
   when a temperature of oil in the gear box is less than a first threshold, and a temperature of the coil is less than a second threshold,
   the computing device operates the oil pump if the temperature of oil in the gear box is equal to or less than the temperature of the coil, and stops the oil pump if the temperature of oil in the gear box is higher than the temperature of the coil.

6. The computing device according to claim 1, wherein
   the cooling water also cools an inverter that supplies electric power to the motor, and
   wherein suppressing the flow rate of the cooling water supplied to the motor does not affect a flow rate of the cooling water supplied to the inverter.

* * * * *